US012725789B2

(12) United States Patent
Kim et al.

(10) Patent No.: US 12,725,789 B2
(45) Date of Patent: Sep. 1, 2026

(54) POSITIVE ELECTRODE ACTIVE MATERIAL FOR LITHIUM SECONDARY BATTERY, METHOD OF PREPARING THE SAME, AND LITHIUM SECONDARY BATTERY COMPRISING THE SAME

(71) Applicant: LG Energy Solution, Ltd., Seoul (KR)

(72) Inventors: Taegon Kim, Daejeon (KR); Jeonggil Kim, Daejeon (KR); Myeongsoo Kim, Daejeon (KR); Min Kwak, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 593 days.

(21) Appl. No.: 18/269,480

(22) PCT Filed: Dec. 22, 2021

(86) PCT No.: PCT/KR2021/019664

§ 371 (c)(1),
(2) Date: Jun. 23, 2023

(87) PCT Pub. No.: WO2022/149767

PCT Pub. Date: Jul. 14, 2022

(65) Prior Publication Data

US 2024/0120468 A1 Apr. 11, 2024

(30) Foreign Application Priority Data

Jan. 7, 2021 (KR) ........................ 10-2021-0001809

(51) Int. Cl.

*H01M 4/505* (2010.01)
*C01G 53/50* (2025.01)
*H01M 4/36* (2006.01)
*H01M 4/525* (2010.01)
*H01M 4/62* (2006.01)
*H01M 4/02* (2006.01)

(52) U.S. Cl.

CPC ............ *H01M 4/366* (2013.01); *C01G 53/50* (2013.01); *H01M 4/505* (2013.01); *H01M 4/525* (2013.01); *H01M 4/625* (2013.01); *C01P 2006/40* (2013.01); *H01M 2004/021* (2013.01); *H01M 2004/028* (2013.01)

(58) Field of Classification Search

None
See application file for complete search history.

(56) References Cited

U.S. PATENT DOCUMENTS 9,768,443 B2 9/2017 Kawakami et al.
10,243,215 B2 3/2019 Shitaba et al.
2005/0153205 A1 7/2005 Hisashi et al.
2012/0034522 A1 2/2012 Sheem et al.
2012/0134914 A1* 5/2012 Paulsen ................. H01M 4/505
423/594.15
2013/0004798 A1* 1/2013 Huang .................... H01M 4/04
264/117
2013/0177784 A1 7/2013 Zhou et al.
2013/0266859 A1 10/2013 Todoriki et al.
2013/0344392 A1 12/2013 Huang et al.
2014/0127568 A1 5/2014 Kawakami et al.
2014/0315089 A1 10/2014 Yu et al.
2015/0194674 A1 7/2015 Hardman et al.
2015/0380725 A1 12/2015 Mine et al.
2016/0285102 A1 9/2016 Shitaba et al.
2017/0149051 A1* 5/2017 Fujita .................... H01M 4/525
2019/0157666 A1 5/2019 Huang et al.
2022/0002158 A1 1/2022 Yang et al.
2022/0013761 A1* 1/2022 Shimamura ........... H01M 4/661

FOREIGN PATENT DOCUMENTS

CN 1642859 A 7/2005
CN 104577123 A 4/2015
CN 107799730 A 3/2018
CN 109301166 A 2/2019
CN 111969204 A 11/2020
CN 112002896 A 11/2020
JP 2010027458 A 2/2010
JP 2013-543220 A 11/2013
JP 2014-112540 A 6/2014
JP 2014150013 A 8/2014
JP 2014179176 A 9/2014
JP 2016012458 A 1/2016
JP 2016189321 A 11/2016
JP 2017103207 A 6/2017
JP 2018098161 A 6/2018
JP 2019164880 A 9/2019
JP 2020057626 A 4/2020

(Continued)

OTHER PUBLICATIONS

S. Deng and V. Berry. Wrinkled, rippled and crumpled graphene: an overview of formation mechanism, electronic properties, and applications, Materials Today, vol. 19, No. 4, May 2016, 197-212.*

(Continued)

*Primary Examiner* — Carlos Barcena

(74) *Attorney, Agent, or Firm* — Lerner David LLP

(57) ABSTRACT

Herein are provided a positive electrode active material for a lithium secondary battery comprising a lithium transition metal oxide on which a crumpled graphene-derived coating layer is formed, and a method of preparing the same. The crumpled graphene has a thickness of 0.1 to 10 nm. In the positive electrode active material, the thin and uniform crumpled graphene-derived coating layer effectively imparts electrical conductivity to the lithium transition metal oxide. When the positive electrode active material is applied to a lithium secondary battery, the performance of the lithium secondary battery, particularly the discharge capacity at a high C-rate is improved.

14 Claims, 8 Drawing Sheets

(56) References Cited

FOREIGN PATENT DOCUMENTS

| | | | |
|---|---|---|---|
| KR | 20140126585 | A | 10/2014 |
| KR | 20150060467 | A | 6/2015 |
| KR | 101769219 | B1 | 8/2017 |
| KR | 20170119973 | A | 10/2017 |
| KR | 101977675 | B1 | 5/2019 |
| KR | 20200056308 | A | 5/2020 |

OTHER PUBLICATIONS

J. Zhao, Z. Tang, Y. Qiu, X. Gao, J. Wan, W. Bi, S. Shen, and J. Yang. Porous crumpled graphene with improved specific surface area based on hydrophilic pre-reduction and its adsorption performance, J. Mater. Sci., 2019, 54:8108-8120.*

W. M. A. El Rouby, Crumpled graphene: preparation and applications, RSC Adv., 2015, 5, 66767.*

International Search Report for PCT/KR2021/019664 mailed Apr. 11, 2022. 4 pgs.

Shi, Yi et al., "Graphene wrapped LiFePO4/C composites as cathode materials for Li-ion batteries with enhanced rate capability", J. Mater. Chem., Jun. 20, 2012, pp. 16465-16470, vol. 22.

Ma, Yanfeng et al., "Graphene-Based Materials for Lithium-Ion Hybrid Supercapacitors", Adv. Mater., Aug. 21, 2015, pp. 5296-5308, vol. 27.

Extended European Search Report including Written Opinion for Application No. 21917929.8 dated Jul. 17, 2024, pp. 1-8.

Search Report dated Sep. 23, 2025 from the Office Action for Chinese Application No. 202180081291.X issued Sep. 26, 2025. 3 pages.

* cited by examiner

【Figure 1A】
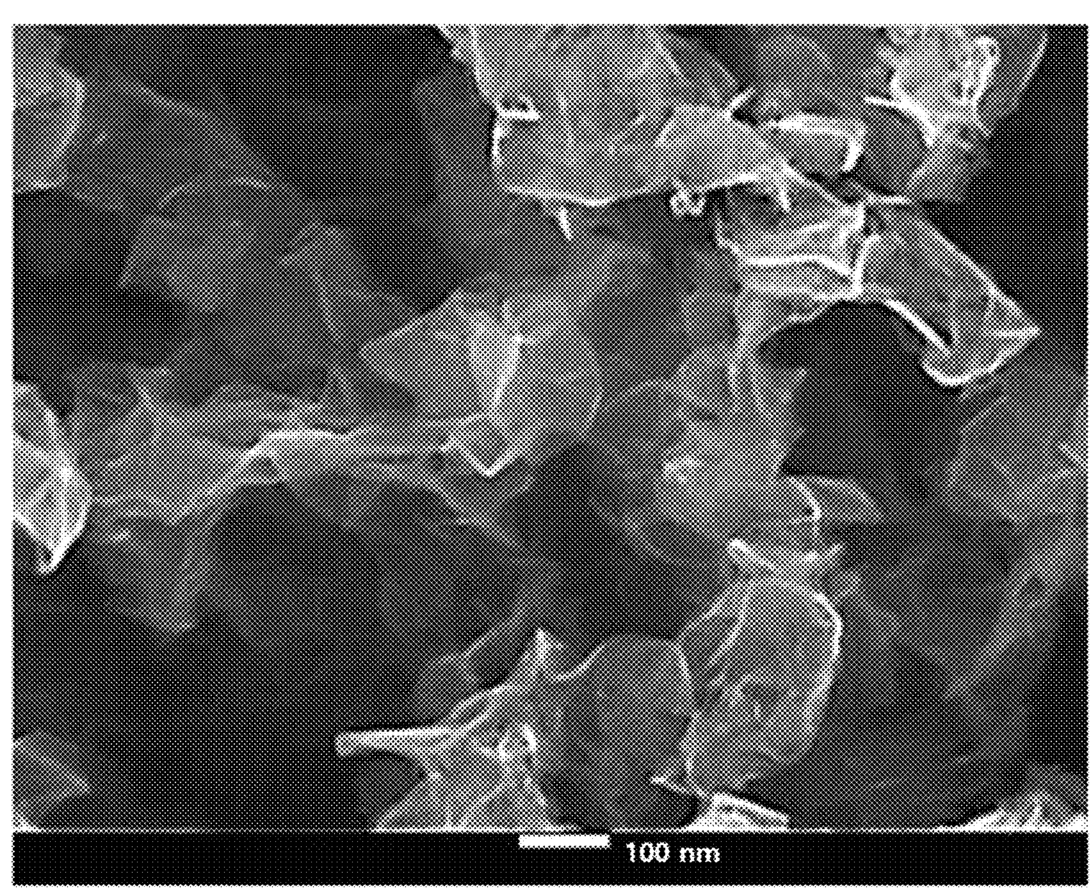

【Figure 1B】
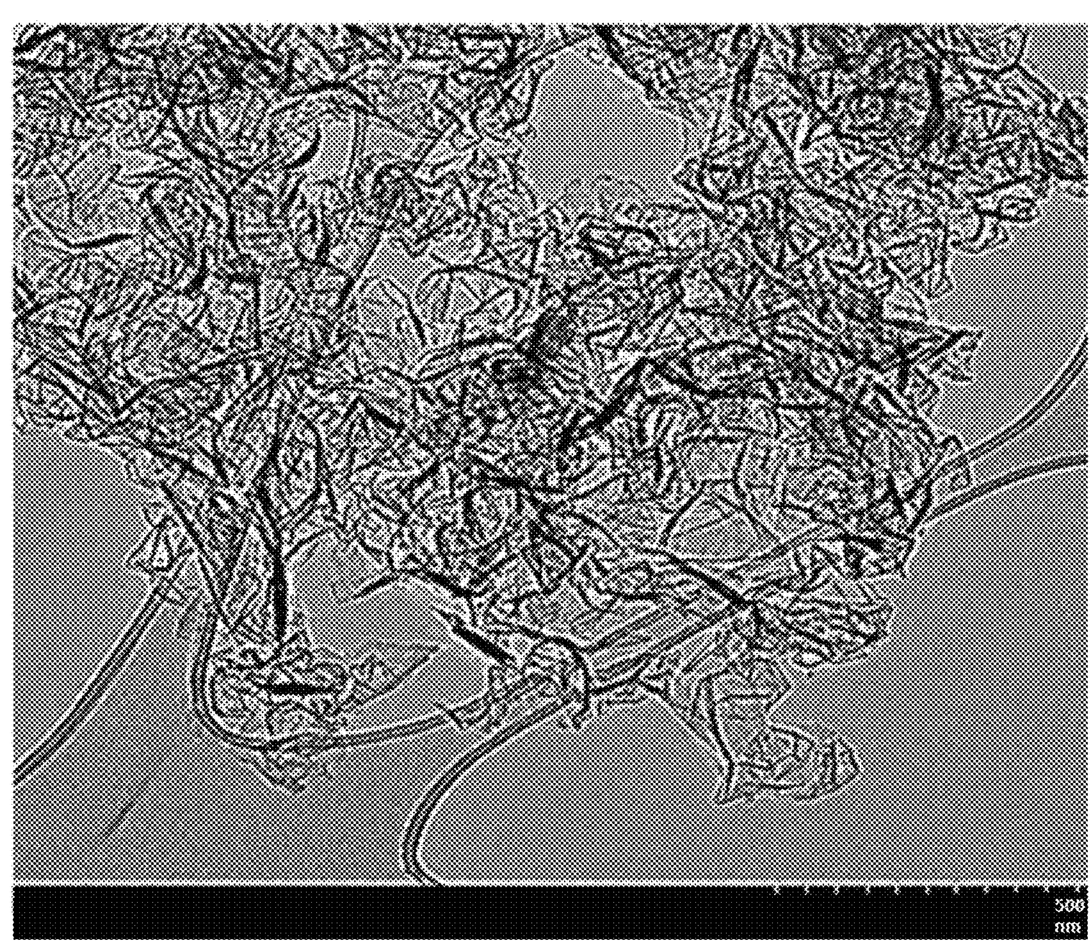

【Figure 2】
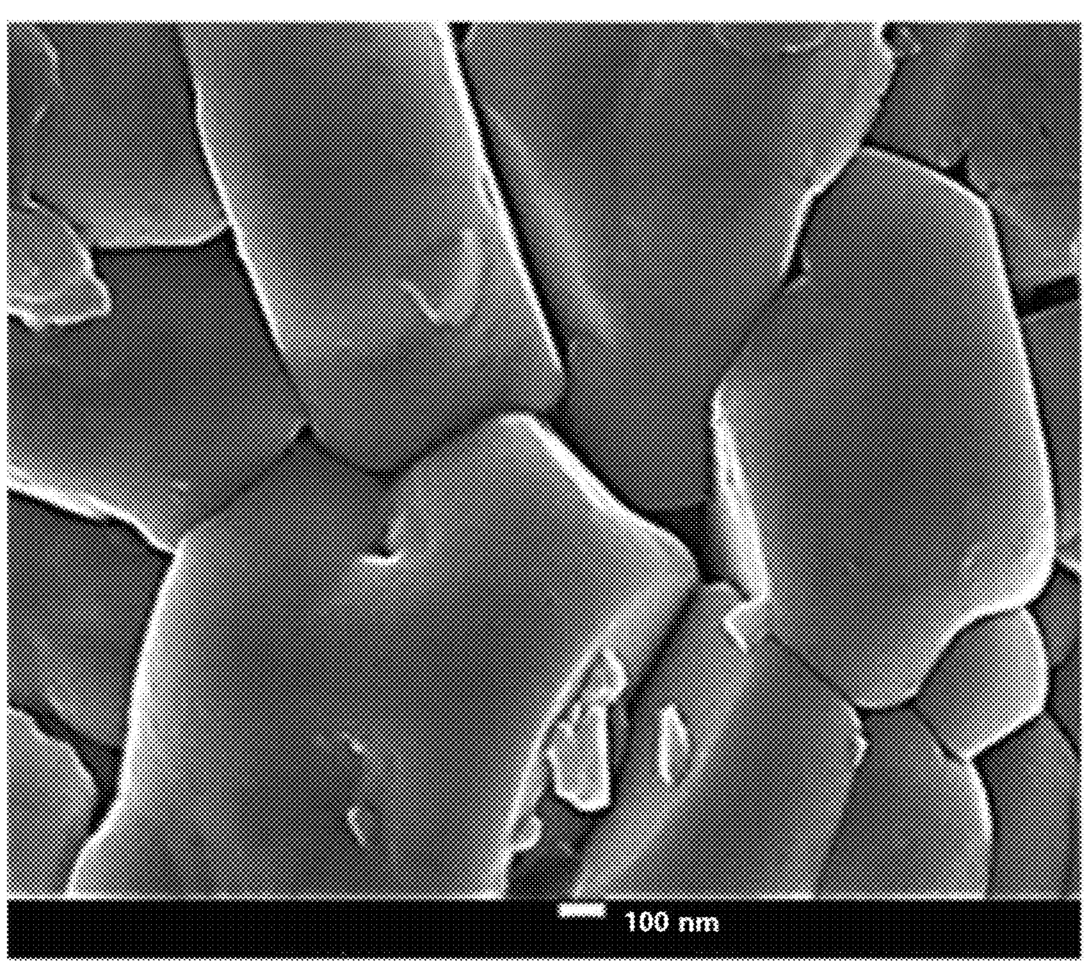

【Figure 3】
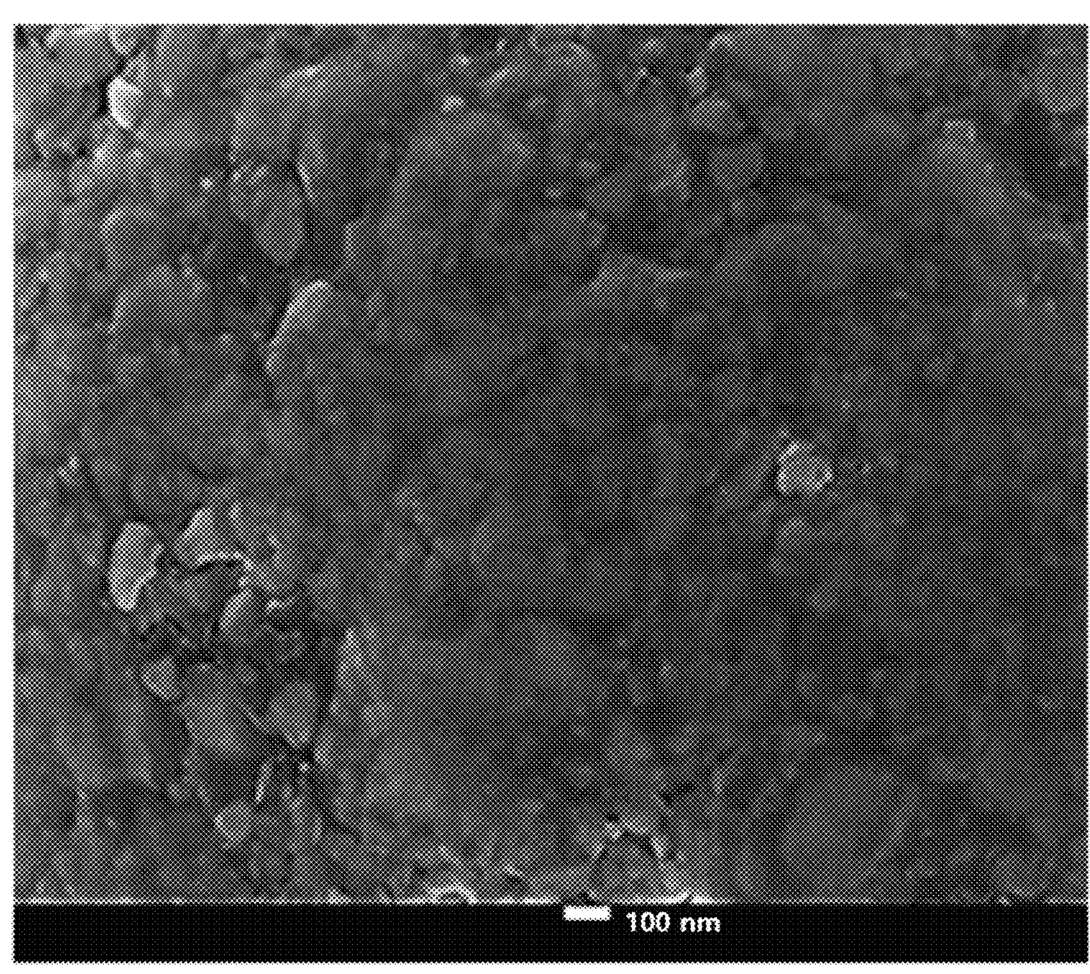

【Figure 4】
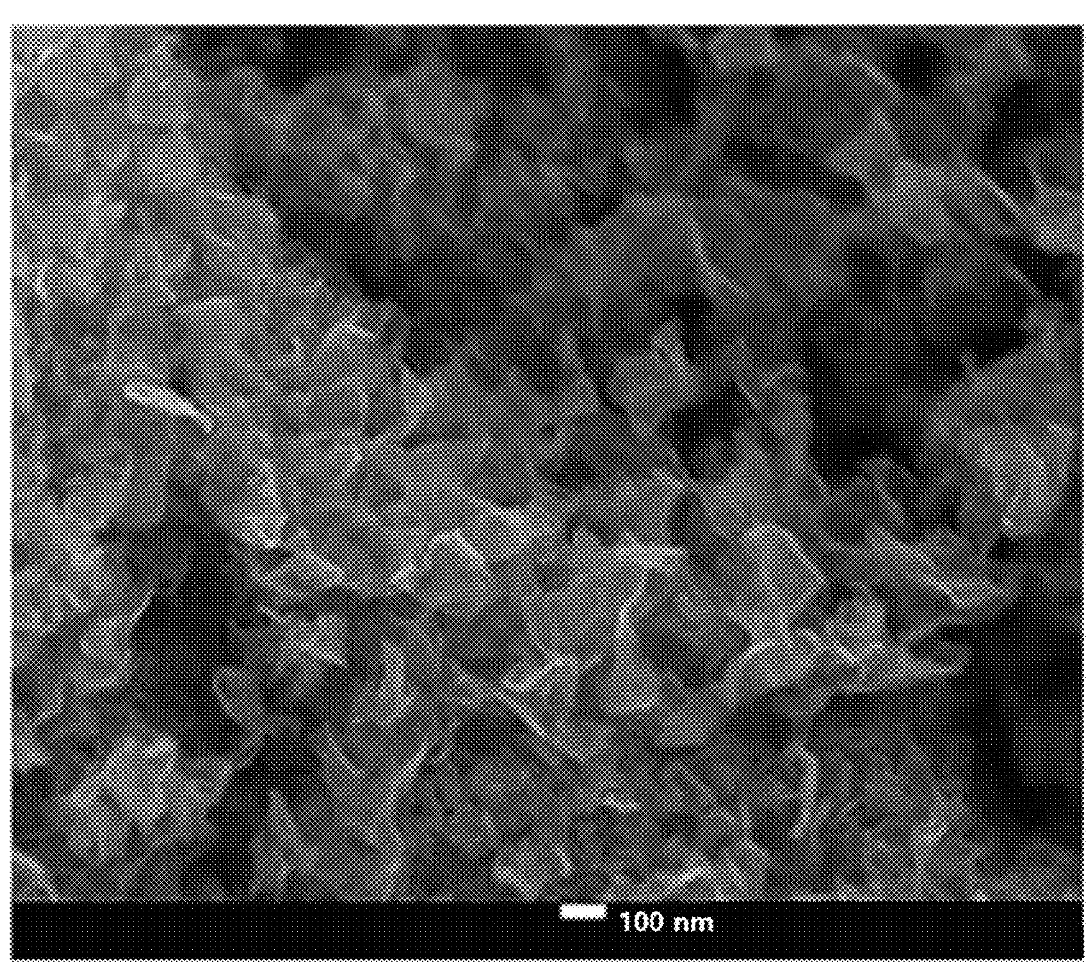

【Figure 5】
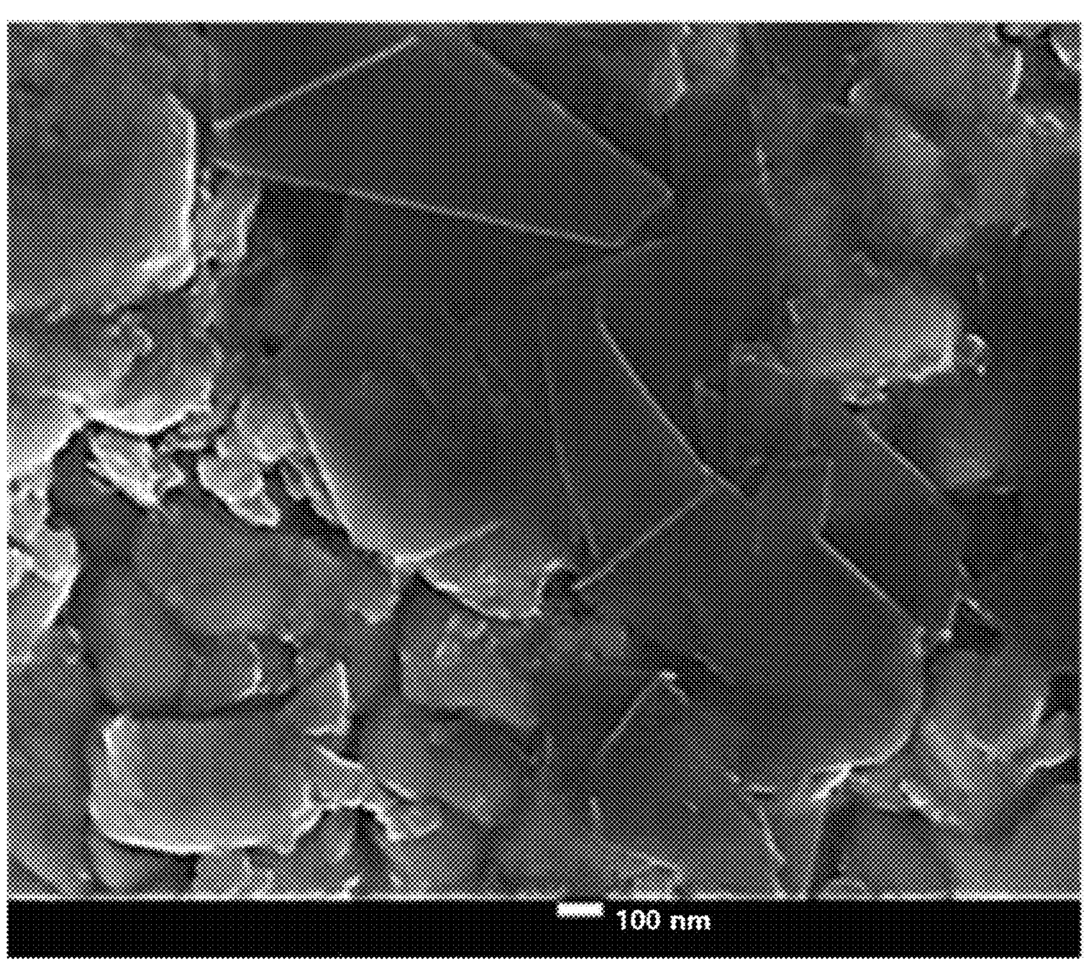

【Figure 6】
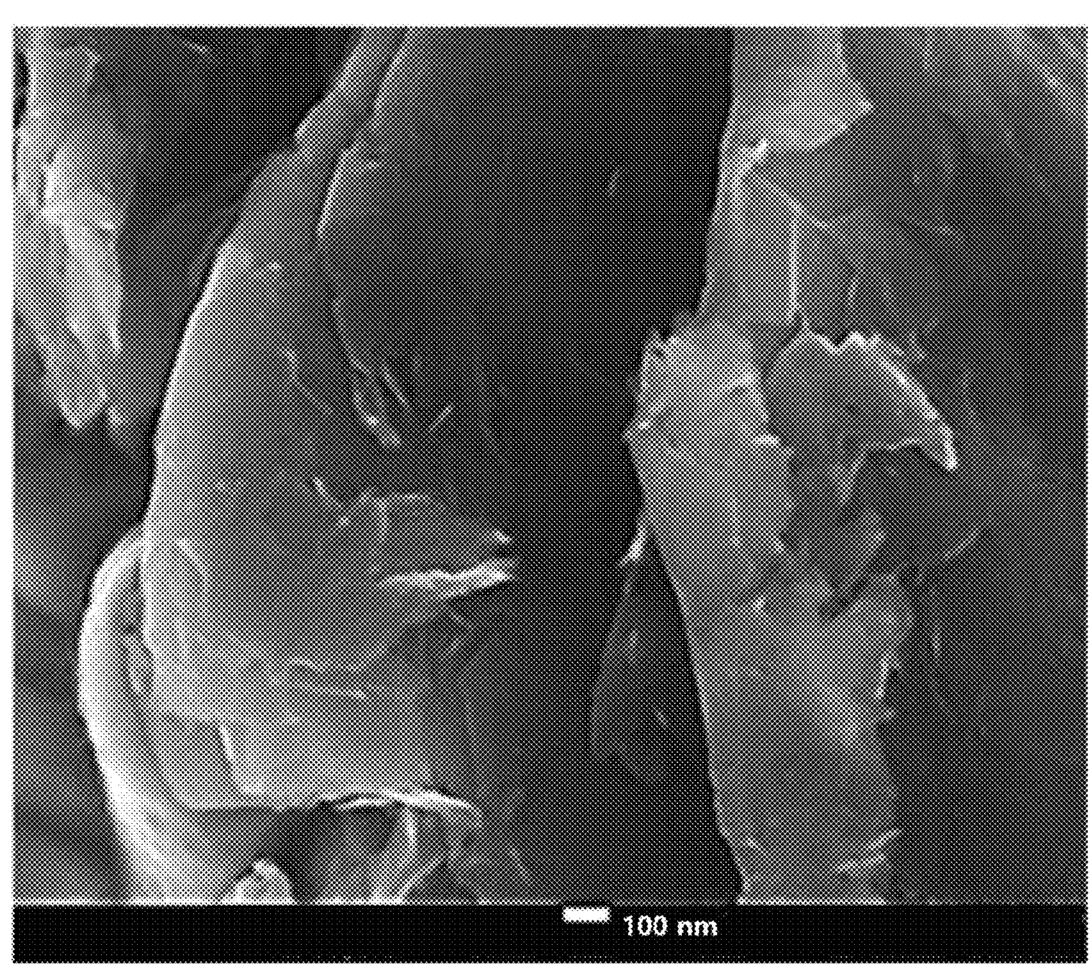

【Figure 7】
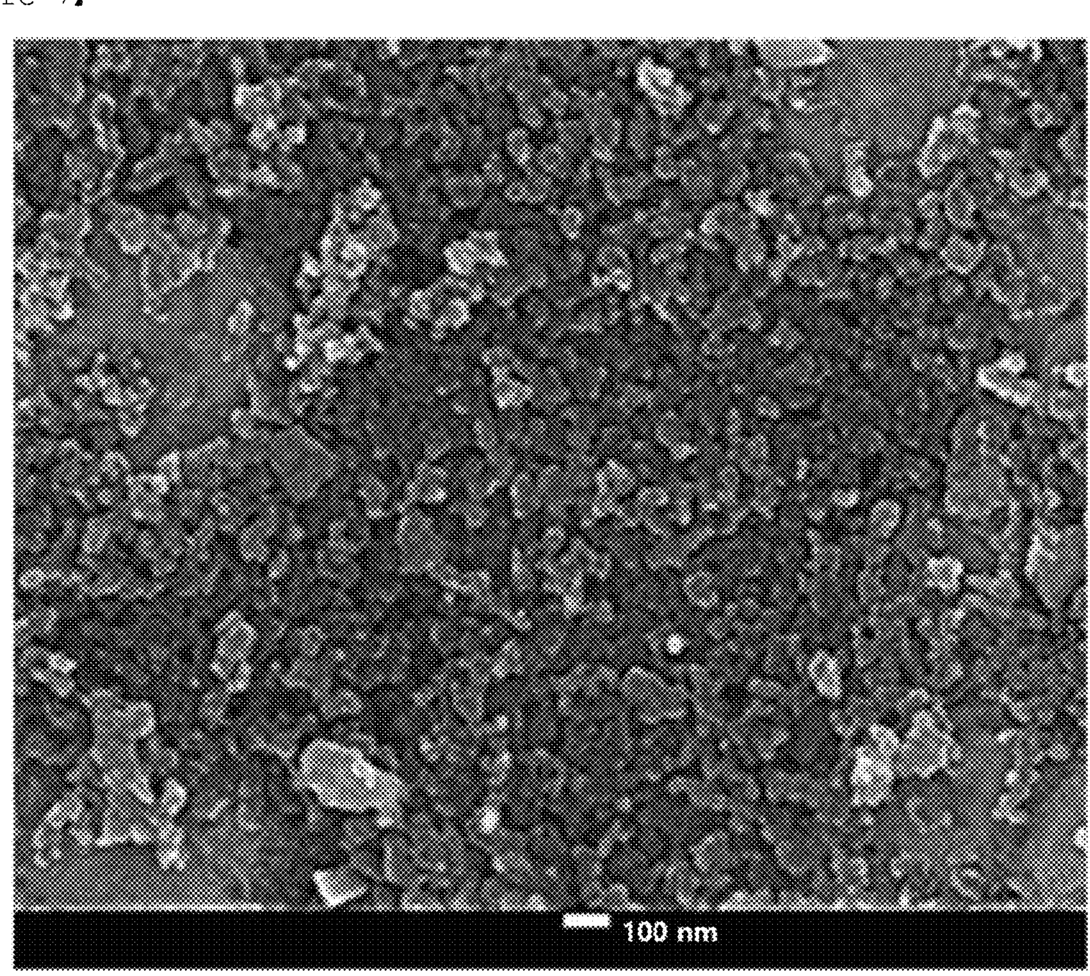

POSITIVE ELECTRODE ACTIVE MATERIAL FOR LITHIUM SECONDARY BATTERY, METHOD OF PREPARING THE SAME, AND LITHIUM SECONDARY BATTERY COMPRISING THE SAME

CROSS-REFERENCE TO RELATED APPLICATIONS

This application is a national phase entry under 35 U.S.C. § 371 of International Application No. PCT/KR2021/019664, filed on Dec. 22, 2021, which claims priority from Korean Patent Application No. 10-2021-0001809 filed on Jan. 7, 2021, the entire contents of which are incorporated herein as part of the present specification.

TECHNICAL FIELD

The present disclosure relates to a positive electrode active material for a lithium secondary battery, a method of preparing the same, and a lithium secondary battery comprising the same. Specifically, the present disclosure relates to a positive electrode active material for a lithium secondary battery comprising a lithium transition metal oxide on which a crumpled graphene-derived coating layer is formed, a method of preparing the same, and a lithium secondary battery comprising the same.

BACKGROUND ART

As technology developments and demands for mobile devices increase, demands for secondary batteries as an energy source have rapidly increased. Among such secondary batteries, a lithium secondary battery having a high energy density and voltage, a long cycle life, and a low self-discharge rate has been commercialized and widely used.

Lithium transition metal oxides are used as a positive electrode active material of a lithium secondary battery, and among them, lithium cobalt oxide of $LiCoO_2$ having a high operating voltage and excellent capacity properties has been mainly used. However, $LiCoO_2$ has very poor thermal properties since the crystal structure is destabilized due to delithiation, and has also limitations in mass use as a power source in fields such as electric vehicles since it is expensive. As a material to replace $LiCoO_2$, lithium manganese oxide ($LiMnO_2$, $LiMn_2O_4$ or the like), a lithium iron phosphate compound ($LiFePO_4$ and the like), lithium nickel oxide ($LiNiO_2$ and the like) or the like has been developed. Among them, research and development have been actively conducted on lithium nickel oxide, which has a high reversible capacity of approximately 200 mAh/g, making it is easy to implement a large-capacity battery. However, $LiNiO_2$ has problems in that it has poor thermal stability compared to $LiCoO_2$, and when an internal short circuit occurs due to external pressure while charging, the positive electrode active material itself is decomposed, resulting in rupture and ignition of the battery. In addition, $LiNiO_2$ has properties that, compared to $LiCoO_2$, the electrical conductivity is low and it is vulnerable to moisture.

In order to solve these problems, carbon coating using a pitch of lithium transition metal oxide has been studied, but a high-temperature heat treatment process for carbonization is absolutely necessary. In this case, the carbon element on the surface reacts with oxygen on the surface of the lithium transition metal oxide, is reduced, and as the oxidation number of the lithium transition metal oxide is greatly changed, the performance of the positive electrode active material is rather deteriorated.

Accordingly, research to improve the performance of the lithium secondary battery by improving the component or structure of the positive electrode active material comprising the lithium transition metal oxide continues in the art.

PRIOR ART DOCUMENTS

Patent Documents (Patent Document 1) Korean Laid-open Patent Application No. 10-2017-0119973

DISCLOSURE

Technical Problem

The present disclosure provides a positive electrode active material for a lithium secondary battery capable of improving the functionality of a positive electrode active material and improving battery performance when applied to a lithium secondary battery, by thinly and uniformly coating a crumpled graphene on a lithium transition metal oxide, a method of preparing the same, and a lithium secondary battery comprising the same.

Technical Solution

According to a first aspect of the present invention, the present disclosure provides a positive electrode active material for a lithium secondary battery comprising a lithium transition metal oxide on which a crumpled graphene-derived coating layer is formed.

In one embodiment of the present invention, the crumpled graphene of the crumpled graphene-derived coating layer has a thickness of 0.1 to 10 nm.

In one embodiment of the present invention, the crumpled graphene has a BET specific surface area of more than 400 $m^2/g$.

In one embodiment of the present invention, the crumpled graphene contains 0.1 to 3% by weight of oxygen based on a total weight of the crumpled graphene.

In one embodiment of the present invention, the crumpled graphene has a size of 50 to 500 nm.

In one embodiment of the present invention, the lithium transition metal oxide is selected from $LiCoO_2$, $LiNiO_2$, $LiMnO_2$, $Li_2MnO_3$, $LiMn_2O_4$, $Li(Ni_aCo_bMn_c)O_2$ ($0<a<1$, $0<b<1$, $0<c<1$, $a+b+c=1$), $LiNi_{1-y}CO_yO_2$ ($O<y<1$), $LiCo_{1-y}Mn_yO_2$, $LiNi_{1-y}Mn_yO_2$ ($O<y<1$), $Li(Ni_aCo_bMn_c)O_4$ ($0<a<2$, $0<b<2$, $0<c<2$, $a+b+c=2$), $LiMn_{2-z}Ni_zO_4$ ($0<z<2$), $LiMn_{2-z}Co_zO_4$ ($0<z<2$), and combinations thereof.

In one embodiment of the present invention, the crumpled graphene-derived coating layer has an $I_D/I_G$ value of 0.1 to 0.2.

In one embodiment of the present invention, the crumpled graphene-derived coating layer has a thickness of 1 to 500 nm.

In one embodiment of the present invention, the lithium transition metal oxide on which the crumpled graphene-derived coating layer is formed has an electrical conductivity of $1.0\times10^{-2}$ to $1.0\times10$ S/cm.

In one embodiment of the present invention, the lithium transition metal oxide on which the crumpled graphene-derived coating layer is formed has a BET specific surface area of 2 to 10 $m^2/g$.

According to a second aspect of the present invention, the present disclosure provides a method of preparing the positive electrode active material for a lithium secondary battery as described above, comprising coating a crumpled graphene on a lithium transition metal oxide to form a crumpled graphene-derived coating layer on the lithium transition metal oxide.

In one embodiment of the present invention, an $I_D/I_G$ value of the crumpled graphene-derived coating layer is 30 to 70% of an $I_D/I_G$ value of the crumpled graphene.

In one embodiment of the present invention, the crumpled graphene is coated on the lithium transition metal oxide by a mechanofusion method.

Advantageous Effects

The positive electrode active material for a lithium secondary battery according to the present disclosure has a structure in which a thin and uniform crumpled graphene-derived coating layer is formed on a lithium transition metal oxide by coating a thin-thick crumpled graphene on the lithium transition metal oxide.

In the positive electrode active material, the thin and uniform crumpled graphene-derived coating layer effectively imparts electrical conductivity to the lithium transition metal oxide.

When the positive electrode active material is applied to a lithium secondary battery, the performance of the lithium secondary battery, particularly the discharge capacity at a high C-rate is improved.

DESCRIPTION OF DRAWINGS

FIG. 1 is SEM images of exemplary crumpled graphene; FIG. 1A is an image observed at a magnification (×100,000), and FIG. 1B is an image observed at a magnification (×10,000).

FIG. 2 is an SEM image of NCM 622 that is not coated with a carbon-based material.

FIG. 3 is a SEM image of the positive electrode active material according to Example 1.

FIG. 4 is a SEM image of the positive electrode active material according to Comparative Example 1.

FIG. 5 is a SEM image of the positive electrode active material according to Comparative Example 2.

FIG. 6 is a SEM image of the positive electrode active material according to Comparative Example 3.

FIG. 7 is a SEM image of the positive electrode active material according to Comparative Example 4.

DETAILED DESCRIPTION

The embodiments provided according to the present invention can be all achieved by the following description. It should be understood that the following description describes preferred embodiments of the present invention and the present invention is not necessarily limited thereto.

When the conditions and methods for measuring properties described in the present specification are not specifically described, the properties are measured using the measurement conditions and methods generally used by those skilled in the art.

Positive Electrode Active Material and a Method of Preparing the Same

The present disclosure provides a positive electrode active material for a lithium secondary battery comprising a lithium transition metal oxide on which a crumpled graphene-derived coating layer is formed.

The "crumpled graphene" is a raw material used before being coated on lithium transition metal oxide, and has a structure in which thin plate-shaped graphene is crumpled in a zigzag manner. Since the crumpled graphene may exist in the coating layer in a state in which the above-described structure is collapsed depending on the coating method, the coating layer formed using the crumpled graphene as a raw material is expressed as a "crumpled graphene-derived coating layer" in the present specification.

In general, graphene is prepared in a top-down way, specifically, a graphene sheet is prepared by chemically exfoliating low-cost graphite with an intercalation mechanism in a strong acid solvent, and mechanically exfoliating it using a shear force in a solvent to which a dispersant is added. However, when the graphene prepared in this way is made into a powder state, a re-stacking problem occurs in which the graphene is superimposed and agglomerated again, and thus, graphene prepared only in a dispersed solution state maintains its original state and may exist separately from each other. In addition, even if the graphene oxide prepared in this way is thermally or chemically reduced, damage to the surface is still present, and thus, the problem of quality deterioration occurs.

The crumpled graphene according to the present disclosure is prepared in a bottom-up way, not a top-down way, and specifically, the crumpled graphene is prepared, which self-standing grows in a single-step thermal plasma process using methane gas as a raw material without the use of other substrates or catalysts, as shown in following Formula 1, and finally, has a zigzag-shaped crumpled structure of small growth units:

[Formula 1]

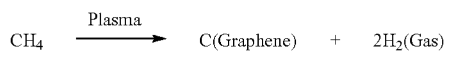

The dispersibility is greatly improved even when used as a powder itself since the crumpled graphene prepared in this way does not have a mutual agglomeration phenomenon even in the powder phase, not the solution phase, and the electrical conductivity is also excellent since the sp2 structure unique to high-quality graphene is well developed without surface defects.

According to one embodiment of the present invention, the crumpled graphene has a thickness of 0.1 to 10 nm, preferably 0.5 to 5 nm, more preferably 1 to 3 nm. The crumpled graphene may easily maintain a zigzag crumpled structure since its thickness is as thin as the above-described range.

According to one embodiment of the present invention, the crumpled graphene has a BET specific surface area of more than 400 $m^2/g$, preferably 400 to 2,000 $m^2/g$, more preferably 400 to 1,600 $m^2/g$. The crumpled graphene has a relatively large BET specific surface area since it has a zigzag crumpled structure with a thin thickness.

According to one embodiment of the present invention, the crumpled graphene contains 0.1 to 3% by weight, preferably 0.1 to 1.5% by weight, more preferably 0.1 to 1% by weight of oxygen based on a total weight of the crumpled graphene. Since the crumpled graphene is prepared in a single-step thermal plasma process using methane gas as a raw material without the use of other substrates or catalysts, as described above, its oxygen content is lower compared to the plate-shaped graphene prepared in a general oxidation process.

According to one embodiment of the present invention, the crumpled graphene has a size of 50 to 500 nm, preferably 100 to 300 nm, more preferably 100 to 200 nm. In this case, the size means the length of the major axis of which the straight-line distance from any one point of the crumpled graphene to another point is the longest, based on one piece of crumpled graphene. Since the crumpled graphene is instantaneously prepared in a single-step thermal plasma process using methane gas as a raw material without the use of other substrates or catalysts, as described above, thin flaky graphene of relatively small size with short growth units is observed as a zigzag crumpled structure. The structure is confirmed through the SEM images of exemplary crumpled graphene in FIGS. 1A and 1B.

According to one embodiment of the present invention, the crumpled graphene has an $I_D/I_G$ value of 0.3 to 0.5, preferably 0.3 to 0.4. The $I_D/I_G$ value represents the ratio of the relative intensities of the D-band and G-band peaks in the Raman spectrum, wherein each of the bands is due to the sp3, sp2 bond structure of carbon atoms, indicating that the smaller the value, the better the layered structure of graphene with a sp2 bond has excellent crystallinity without defects. The crumpled graphene has an $I_D/I_G$ value somewhat larger than that of the plate-shaped graphene and much smaller than that of Carbon Black.

According to one embodiment of the present invention, the crumpled graphene has an electrical conductivity of $1.0\times10^2$ to $1.0\times10^3$ S/cm, preferably $1.0\times10^2$ to $5.0\times10^2$ S/cm, more preferably $1.0\times10^2$ to $3.0\times10^2$ S/cm. Carbon-based materials such as graphene and Carbon Black basically have high electrical conductivity and contribute to improving the electrical conductivity of lithium transition metal oxide having low electrical conductivity, but the electrical conductivity of carbon-based materials is reflected in lithium transition metal oxide as it is, and thus, it is important that the carbon-based material be uniformly coated on the lithium transition metal oxide in order to effectively improve electrical conductivity.

The lithium transition metal oxide functions as a substantial positive electrode active material for exchanging electrons in the positive electrode of a lithium secondary battery, and according to one embodiment of the present invention, the transition metal in the lithium transition metal oxide has the form of $Li_{1+x}M_yO_{2+z}$ ($0\leq x\leq5$, $0<y\leq2$, $0\leq z\leq2$), wherein M is selected from the group consisting of Ni, Co, Mn, Fe, P, Al, Mg, Ca, Zr, Zn, Ti, Ru, Nb, W, B, Si, Na, K, Mo, V, and combinations thereof, and is not particularly limited within the above range. More specifically, the lithium transition metal oxide is elected from $LiCoO_2$, $LiNiO_2$, $LiMnO_2$, $Li_2MnO_3$, $LiMn_2O_4$, $Li(Ni_aCo_bMn_c)O_2$ ($0<a<1$, $0<b<1$, $0<c<1$, $a+b+c=1$), $LiNi_{1-y}Co_yO_2$ ($O<y<1$), $LiCo_{1-y}Mn_yO_2$, $LiNi_{1-y}Mn_yO_2$ ($O<y<1$), $Li(Ni_aCo_bMn_c)O_4$ ($0<a<2$, $0<b<2$, $0<c<2$, $a+b+c=2$), $LiMn_{2-z}Ni_zO_4$ ($0<z<2$), $LiMn_{2-z}Co_zO_4$ ($0<z<2$), and combinations thereof.

The crumpled graphene is coated on the lithium transition metal oxide. As the coating method, a method generally used in the art may be used, but a coating method capable of forming a mechanochemical bonding to increase the bonding force between the lithium transition metal oxide and the coating layer may be used. According to one embodiment of the present invention, the mixture is coated on the lithium transition metal oxide by a mechanofusion method capable of applying a high shear force. When the crumpled graphene is coated on the lithium transition metal oxide by the mechanofusion method, the zigzag structure of the crumpled graphene is partially or completely collapsed, and thus, it may be coated thinly and uniformly on the surface of the lithium transition metal oxide.

The crumpled graphene is coated on the lithium transition metal oxide to form a crumpled graphene-derived coating layer on the lithium transition metal oxide.

According to one embodiment of the present invention, the crumpled graphene-derived coating layer has a thickness of 1 to 500 nm, preferably 1 to 300 nm, more preferably 1 to 100 nm. In particular, the structure of crumpled graphene may be collapsed by a coating method such as mechanofusion method, so that the crumpled graphene may be coated thinly and uniformly on the surface of the lithium transition metal oxide.

According to one embodiment of the present invention, the crumpled graphene-derived coating layer has an $I_D/I_G$ value of 0.1 to 0.2, preferably 0.15 to 0.2. As described above, considering that the crumpled graphene before coating has an $I_D/I_G$ value of 0.3 to 0.5, the $I_D/I_G$ value decreases by a significant percentage by coating. According to one embodiment of the present invention, the $I_D/I_G$ value of the crumpled graphene-derived coating layer is 30 to 70%, preferably 35 to 65%, more preferably 40 to 60% of the $I_D/I_G$ value of the crumpled graphene. Since the $I_D/I_G$ value is due to the sp2, sp3 bond structure of carbon atoms, the decrease in the $I_D/I_G$ value means that the zigzag-shaped crumpled graphene coating closely adheres to the surface of the active material in a planar manner beyond a simple physical adhesion level, and at this time, as the zigzag-shaped structural stress is resolved, the sp2 structure on the plane is developed. This may mean that at this time, as structural defects of carbon atoms inside the crumpled graphene are resolved, a mechanically and chemically stronger and more robust carbon coating layer is formed.

According to one embodiment of the present invention, the lithium transition metal oxide on which the crumpled graphene-derived coating layer is formed has an electrical conductivity of $1.0\times10^{-2}$ to $1.0\times10$ S/cm, preferably $1.0\times10^{-2}$ to $1.0\times10^{-1}$ S/cm, more preferably $5.0\times10^{-2}$ to $1.0\times10^{-1}$ S/cm. Since the thin and uniform crumpled graphene-derived coating layer effectively imparts electrical conductivity to the lithium transition metal oxide, it has high electrical conductivity compared to when coated with other carbon-based materials.

According to one embodiment of the present invention, the lithium transition metal oxide on which the crumpled graphene-derived coating layer is formed has a BET specific surface area of 2 to 10 $m^2/g$, preferably 2 to 7.5 $m^2/g$, more preferably 2 to 5 $m^2/g$. As described above, the crumpled graphene material itself has a high BET specific surface area of more than 400 $m^2/g$, but during the coating process, as the zigzag structure of the crumpled graphene is partially or completely collapsed to closely adhere to the surface of the active material in a planar manner, the specific surface area after coating decreases relatively significantly compared to that before coating.

The positive electrode active material for a lithium secondary battery according to the present disclosure effectively imparts electrical conductivity to the lithium transition metal oxide by forming a thin and uniform graphene coating layer using crumpled graphene as a raw material on the lithium transition metal oxide. When the positive electrode active material may be applied to a lithium secondary battery, the performance of the lithium secondary battery, particularly the discharge capacity at a high C-rate is improved.

Lithium Secondary Battery

The present disclosure provides a lithium secondary battery comprising a positive electrode, a negative electrode, a separator, and an electrolyte. In the lithium secondary battery, the positive electrode and the negative electrode are placed to face each other, and the separator is interposed between the positive electrode and the negative electrode. An electrode assembly of the positive electrode, the negative electrode and the separator is accommodated in a battery container, and the battery container is filled with the electrolyte.

The positive electrode comprises a positive electrode current collector, and a positive electrode active material layer that is formed on the positive electrode current collector and includes the positive electrode active material described above.

In the positive electrode, the positive electrode current collector is not particularly limited as long as it has conductivity without inducing chemical changes to a battery, and for example, stainless steel, aluminum, nickel, titanium, baked carbon or aluminum, or stainless steel of which surface is treated with carbon, nickel, titanium, silver or the like, or the like, may be used. In addition, the positive electrode current collector may commonly have a thickness of 3 μm to 500 μm, and micro-unevenness may be formed on the surface of the positive electrode current collector to increase the adhesion of the positive electrode active material. It may be used in various forms such as, for example, a film, a sheet, a foil, a net, a porous body, a foam, and a non-woven body.

The positive electrode active material layer may comprise a conductive additive and a binder, together with the positive electrode active material described above.

The conductive additive is used to impart conductivity to an electrode, and may be used without any particular limitation as long as it does not cause chemical change and has electronic conductivity in the constituted battery. Specific examples may include graphite such as natural graphite and artificial graphite; carbon-based materials such as Carbon Black, Acetylene Black, Ketjen Black, Channel Black, Furnace Black, Lamp Black, Thermal Black, single-walled or multi-walled carbon nanotubes, carbon fibers, graphene, activated carbon, and activated carbon fibers; metal powders or metal fibers such as copper, nickel, aluminum, and silver; conductive whiskers such as zinc oxide and potassium titanate; conductive metal oxides such as titanium oxide; and conductive polymers such as polyphenylene derivatives; and the like, and among them, one kind alone or a mixture of two or more kinds may be used. The conductive additive may be commonly included in an amount of 1 to 30% by weight based on a total weight of the positive electrode active material layer.

The binder serves to improve adhesion between particles of the positive electrode active material and adhesion between the positive electrode active material and the positive electrode current collector. Specific examples may include polyvinylidene fluoride (PVDF), a vinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene polymer (EPDM), a sulfonated EPDM, styrene-butadiene rubber, fluorine rubber, various copolymers thereof, and the like, and among them, one type alone or a mixture of two or more types may be used. The binder may be included in an amount of 1 to 30% by weight based on a total weight of the positive electrode active material layer.

The positive electrode may be prepared according to a conventional positive electrode preparation method, except that the positive electrode active material described above is used. Specifically, it may be prepared by applying on a positive electrode current collector a composition for forming a positive electrode active material layer comprising the positive electrode active material described above, and, optionally, the binder and the conductive additive, followed by drying and rolling. In this case, the kind and content of the positive electrode active material, the binder and the conductive additive are as described above.

The solvent may be a solvent generally used in the art and may include dimethyl sulfoxide (DMSO), isopropyl alcohol, N-methylpyrrolidone (NMP), acetone, water, and the like, and among them, one type alone or a mixture of two or more types may be used. The amount of the solvent used is sufficient to have viscosity capable of dissolving or dispersing the positive electrode active material, the conductive additive and the binder in consideration of the application thickness of the slurry and the production yield, and exhibiting excellent thickness uniformity when subsequently applied to prepare a positive electrode.

As another method, the positive electrode may be prepared by casting the composition for forming a positive electrode active material layer on a separate support, and then laminating on the positive electrode current collector a film obtained by peeling it off from the support.

The negative electrode comprises a negative electrode current collector, and a negative electrode active material layer disposed on the negative electrode current collector.

The negative electrode active material layer optionally comprises a binder and a conductive additive, together with the negative electrode active material.

As the negative electrode active material, compounds capable of reversible intercalation or deintercalation of lithium may be used. Specific examples may include carbonaceous materials such as artificial graphite, natural graphite, graphitized carbon fiber and amorphous carbon; metallic compounds capable of alloying with lithium such as Si, Al, Sn, Pb, Zn, Bi, In, Mg, Ga, Cd, Si alloys, Sn alloys or Al alloys; metal oxides capable of doping or dedoping lithium such as $SiO_\beta$ ($0<\beta<2$), $SnO_2$, vanadium oxides and lithium vanadium oxides; or composites including the metallic compounds and the carbonaceous materials such as a Si-C composite and a Sn—C composite; and the like, and among them, any one or a mixture of two or more may be used. In addition, as the negative electrode active material, a metal lithium thin film may be used. In addition, as the carbonaceous material, low-crystalline carbon, high-crystalline carbon and the like may all be used. Representative examples of the low-crystalline carbon include soft carbon and hard carbon, and representative examples of the high-crystalline carbon include high-temperature baked carbon such as amorphous, plate-shaped, scaly, spherical or fibrous natural graphite or artificial graphite, Kish graphite, pyrolytic carbon, mesophase pitch-based carbon fiber, mesocarbon microbeads, mesophase pitches, and petroleum or coal tar pitch-derived cokes.

The binder, the conductive additive and the negative electrode current collector may be selected with reference to the constitutions in the positive electrode described above, but are not limited thereto. In addition, the method of forming the negative electrode active material layer on the negative electrode current collector may include known application methods as in the positive electrode, but is not particularly limited thereto.

In the lithium secondary battery, the separator separates the negative electrode and the positive electrode and provides a migration passage for lithium ions, and those normally used as a separator in a lithium secondary battery may be used without any particular limitation, and in particular, those having an excellent electrolyte absorption ability while having low resistance to ion migration of the electrolyte are preferable. Specifically, a porous polymer film, for example, a porous polymer film made of a polyolefin-based polymer such as an ethylene homopolymer, a propylene homopolymer, an ethylene/butene copolymer, an ethylene/hexene copolymer and an ethylene/methacrylate copolymer, or a laminated structure of two or more layers thereof may be used. In addition, conventional porous non-woven fabrics, for example, non-woven fabrics made of high melting point glass fiber, polyethylene terephthalate fiber or the like may be used. In addition, a coated separator including a ceramic component or a polymer material may be used in order to secure heat resistance or mechanical strength, and a single-layer or multi-layer structure may be selectively used.

The electrolyte used in the present disclosure may include, but is not limited to, organic liquid electrolytes, inorganic liquid electrolytes, solid polymer electrolytes, gel-type polymer electrolytes, solid inorganic electrolytes, molten inorganic electrolytes and the like that may be used when preparing a lithium secondary battery.

Specifically, the electrolyte may include an organic solvent and a lithium salt.

The organic solvent may be used without any particular limitation as long as it is capable of serving as a medium through which ions involved in an electrochemical reaction of a battery migrate. Specifically, as the organic solvent, ester-based solvents such as methyl acetate, ethyl acetate, γ-butyrolactone and ε-caprolactone; ether-based solvents such as dibutyl ether and tetrahydrofuran; ketone-based solvents such as cyclohexanone; aromatic hydrocarbon-based solvents such as benzene and fluorobenzene; carbonate-based solvents such as dimethyl carbonate (DMC), diethyl carbonate (DEC), methyl ethyl carbonate (MEC), ethyl methyl carbonate (EMC), ethylene carbonate (EC) and propylene carbonate (PC); alcohol-based solvents such as ethyl alcohol and isopropyl alcohol; nitriles such as R—CN (wherein R is a C2 to C20 linear, branched or cyclic hydrocarbon group, and may include a double bond, an aromatic ring or ether bond); amides such as dimethylformamide; dioxolanes such as 1,3-dioxolane; sulfolanes; or the like may be used. Among them, carbonate-based solvents are preferable, and a mixture of a cyclic carbonate (for example, ethylene carbonate, propylene carbonate or the like) having high ion conductivity and high dielectric constant capable of enhancing the charge and discharge performance of a battery and a low-viscosity linear carbonate-based compound (for example, ethyl methyl carbonate, dimethyl carbonate, diethyl carbonate or the like) is more preferable. In this case, the performance of the electrolyte may be excellent when a mixture of the cyclic carbonate and the linear carbonate in a volume ratio of about 1:1 to about 1:9 is used.

The lithium salt may be used without any particular limitation as long as it is a compound capable of providing lithium ions used in a lithium secondary battery. Specifically, as the lithium salt, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$. LiCl, LiI, $LiB(C_2O_4)_2$ or the like may be used. The lithium salt is preferably used at a concentration within the range of 0.1 to 2.0 M. When the concentration of the lithium salt is included in the above-mentioned range, the electrolyte has appropriate conductivity and viscosity, so that excellent electrolyte performance may be exhibited and lithium ions may migrate effectively.

For the purpose of improving the lifespan properties of the battery, suppressing a decrease in battery capacity, improving discharge capacity of the battery, and the like, the electrolyte may further include, in addition to the electrolyte components, one or more types of additives, for example, haloalkylene carbonate-based compounds such as difluoroethylene carbonate, pyridine, triethylphosphite, triethanolamine, cyclic ether, ethylenediamine, n-glyme, hexamethyl phosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxyethanol and aluminum trichloride. In this case, the additive may be included in an amount of 0.1 to 5% by weight based on a total weight of the electrolyte.

As described above, the lithium secondary battery comprising the positive electrode active material according to the present disclosure stably exhibits excellent discharge capacity, output properties and capacity retention rate, and thus, it is useful in the fields of portable devices such as a mobile phone, a laptop computer and a digital camera, and electric vehicles such as a hybrid electric vehicle (HEV).

Accordingly, according to another embodiment of the present invention, herein are provided a battery module comprising the lithium secondary battery as a unit cell, and a battery pack comprising the same.

The battery module or the battery pack may be used as a power supply for medium-to-large devices of any one or more of power tools; electric vehicles including electric vehicles (EV), hybrid electric vehicles and plug-in hybrid electric vehicles (PHEV); or electric storage systems.

EXAMPLES

Hereinafter, preferred examples will be presented to help the understanding of the present invention, but the following examples are provided not to limit the present invention but to better understand the present invention.

EXAMPLES

Example 1

A positive electrode active material coated with crumpled graphene was prepared by mixing crumpled graphene (manufacturer: Nanointegris Technologies, Inc.; product: PureWave Graphene; average thickness: 2.4 nm; BET specific surface area: more than 400 $m^2/g$; size: 150-200 nm; oxygen content: 1%) with $LiNi_{0.6}Co_{0.2}Mn_{0.2}O_2$ (NCM 622) in a weight ratio of 1:99, and then putting the mixture into a mechanofusion device (manufacturer: Hosokawa Micron Corporation; product: Nobilta NOB-130) and operating it under the conditions of 3,000 rpm for 10 minutes.

Comparative Example 1

A positive electrode active material coated with crumpled graphene was prepared in the same manner as in Example 1, except that a simple mechanical mixing device (manufacturer: Red Devil, Inc.; product: Classic Shaker 1400; condition: 60 Hz, 60 minutes) was used instead of the mechanofusion device when coated with crumpled graphene.

Comparative Example 2

A positive electrode active material coated with plate-shaped graphene was prepared in the same manner as in Example 1, except that plate-shaped graphene (manufacturer: KNANO Graphene Technology Corporation Limited; product: Graphene Powder; average thickness: 100 nm; BET specific surface area: 51 $m^2/g$; size: 7 μm; oxygen content: less than 2%) was used instead of the crumpled graphene.

Comparative Example 3

A positive electrode active material coated with plate-shaped graphene was prepared in the same manner as in Comparative Example 2, except that a simple mechanical mixing device (manufacturer: Red Devil, Inc.; product: Classic Shaker 1400; condition: 60 Hz, 60 minutes) was used instead of the mechanofusion device when coated with plate-shaped graphene.

Comparative Example 4

A positive electrode active material coated with Carbon Black was prepared in the same manner as in Example 1, except that Carbon Black (manufacturer: Imerys; product: Super C65) was used instead of the crumpled graphene.

Comparative Example 5

A positive electrode active material coated with graphene was prepared in the same manner as in Comparative Example 4, except that a simple mechanical mixing device (manufacturer: Red Devil, Inc.; product: Classic Shaker 1400; condition: 60 Hz, 60 minutes) was used instead of the mechanofusion device when coated with Carbon Black.

Experimental Examples

Experimental Example 1: Comparison of SEM Images of the Prepared Positive Electrode Active Materials The NCM 622 on which a carbon-based material (graphene or Carbon Black) was not coated, and the positive electrode active materials according to Examples 1 and Comparative Examples 1 to 4 were photographed using scanning electron microscopy (SEM) (magnification: ×50,000). The photographed SEM images are shown in FIG. 2 (NCM 622), FIG. 3 (Example 1), FIG. 4 (Comparative Example 1), FIG. 5 (Comparative Example 2), FIG. 6 (Comparative Example 3) and FIG. 7 (Comparative Example 4).

When evaluating the coated carbon-based materials based on the SEM image (FIG. 2) of the NCM 622 on which the carbon-based material is not coated, first, in the case of crumpled graphene, it could be confirmed that when coated using a mechanical mixing device, the structure of crumpled graphene was maintained as it is, so a uniform coating layer was not formed (FIG. 4), but when coated using a mechanofusion device, the structure of crumpled graphene was collapsed, so a thin and uniform coating layer was formed (FIG. 3).

In contrast, in the case of plate-shaped graphene, it could be confirmed that when coated using a mechanical mixing device, the plate-shaped graphene was mutually aggregated and agglomeration phenomenon occurred, so a uniform coating layer was not formed (FIG. 6), and even when a mechanofusion device was used, the plate-shaped graphene was covered on the surface of NCM 622 as it is, so a uniform coating layer was not formed (FIG. 5). In addition, even in the case of Carbon Black, it could be confirmed that even when a mechanofusion device was used, the Carbon Black was covered on the surface of NCM 622 as it is aggregated, so a uniform coating layer was not formed (FIG. 7).

Experimental Example 2: Comparison of electrical conductivity, BET specific surface area and $I_D/I_G$ values of carbon-based materials Electrical conductivity, BET specific surface area and $I_D/I_G$ values before and after coating were measured for the crumpled graphenes used in Example 1 and Comparative Example 1, the plate-shaped graphenes used in Comparative Examples 2 and 3, and the Carbon Black used in Comparative Examples 4 and 5, and are shown in Table 1 below. Electrical conductivity and BET specific surface area are measured values for the entire material, and $I_D/I_G$ values are measured values for carbon-based materials. 5 g of the sample was put in a holder, and then rolled by applying a force of 30 kN, and the electrical conductivity was measured with an electrical conductivity measuring device (manufacturer: Mitsubishi Chemical Corporation; product: MCP-PD51) using a 4-pin probe. The BET specific surface area was measured with a BET specific surface area measuring device (manufacturer: Nippon Bell Corporation; product: BEL_SORP_MAX) by degassing at 200° C. for 8 hours and performing $N_2$ adsorption/desorption at 77K. The $I_D/I_G$ value was measured by analyzing a Raman spectrum with an Ar-ion laser of 514.5 nm wavelength through a Raman spectrometer (manufacturer: Jasco, Inc.; product: NRS-2000B).

TABLE 1

| Carbon-Based Material | Coating Condition | Electrical Conductivity (S/cm) | BET Specific Surface Area ($m^2/g$) | $I_D/I_G$ Value | Change Rate of $I_D/I_G$ Value (%) |
|---|---|---|---|---|---|
| Crumpled | Before coating | $2.22 \times 10^2$ | 402 | 0.37 | — |
| Graphene | After coating in Example 1 | $5.61 \times 10^{-2}$ | 3.83 | 0.18 | 48.6 |
| | After coating in Comparative Example 1 | $8.38 \times 10^{-3}$ | 5.08 | 0.34 | 91.9 |

TABLE 1-continued

| Carbon-Based Material | Coating Condition | Electrical Conductivity (S/cm) | BET Specific Surface Area ($m^2/g$) | $I_D/I_G$ Value | Change Rate of $I_D/I_G$ Value (%) |
|---|---|---|---|---|---|
| Plate-Shaped Graphene | Before coating | $1.84 \times 10^3$ | 51 | 0.22 | — |
| | After coating in Comparative Example 2 | $4.62 \times 10^{-3}$ | 0.63 | 0.17 | 77.3 |
| | After coating in Comparative Example 3 | $2.32 \times 10^{-3}$ | 0.78 | 0.21 | 95.5 |
| Carbon Black | Before coating | $1.76 \times 10$ | 115 | 1.09 | — |
| | After coating in Comparative Example 4 | $3.58 \times 10^{-3}$ | 1.59 | 1.05 | 96.3 |
| | After coating in Comparative Example 5 | $2.49 \times 10^{-3}$ | 1.84 | 1.08 | 99.1 |

* Change rate of ID/IG value (%) = $I_D/I_G$ value after coating/$I_D/I_G$ value before coating × 100

According to Table 1 above, unlike plate-shaped graphene and Carbon Black, it can be confirmed that when crumpled graphene is used, electrical conductivity and specific surface area are maintained high. In addition, in the case of using crumpled graphene, when coated with a mechanofusion device rather than a mechanical mixing device, the surface was coated smoothly enough to significantly reduce the BET specific surface area compared to the raw material, and electrical conductivity could be improved by about 7 times. As can be confirmed from the $I_D/I_G$ values, it is judged that when coated with crumpled graphene using a mechanofusion device, the zigzag structure of crumpled graphene is collapsed to closely adhere to the surface, and as structural stress is resolved, the structural defects for the sp2 bond on the plane are alleviated and the $I_D/I_G$ value is remarkably reduced, and thus, the electrical conductivity is remarkably improved while a thin and uniform coating layer is formed.

Experimental Example 3: Evaluation of C-rate properties of lithium secondary batteries using the positive electrode active materials of Example 1 and Comparative Examples 1 to 5

A positive electrode was manufactured, by mixing each of the positive electrode active materials in Examples 1 and Comparative Examples 1 to 5 with a carbon black conductive additive and a PVDF binder in a N-methylpyrrolidone solvent in a weight ratio of 97.5:1:1.5 (positive electrode active material: conductive additive: binder) to prepare a positive electrode active material slurry, applying the slurry to one surface of an aluminum current collector (loading amount: 10-12 mg/cm$^2$), followed by drying it at 130° C., and then rolling it.

As a negative electrode, lithium metal was used, and a porous polyethylene separator was interposed between the positive electrode and the negative electrode to prepare an electrode assembly. The electrode assembly was placed inside the battery case, and then an electrolyte was injected into the case to manufacture a lithium secondary battery. In this case, the electrolyte was prepared by dissolving 1.0 M lithium hexafluorophosphate ($LiPF_6$) in an organic solvent consisting of ethylene carbonate/dimethyl carbonate/ethyl methyl carbonate (mixed volume ratio of EC/DMC/EMC=3/4/3).

Initial charge and discharge capacity measurement and cell verification were performed by manufacturing a coin half cell battery by the above-described method, and then CC/CV charging at 0.1 C to 4.3 V at 25° C., charging at 0.005 C until cut-off, and CC discharging at 0.1 C to 3.0 V. Thereafter, the manufactured battery was charged at a constant current of 0.2 C to 4.25 V and at 0.05 C until cut-off at 25° C. Then, the initial charge and discharge capacities were measured by discharging at a constant current of 0.2 C to 2.5 V.

Thereafter, it was charged at a constant current of 0.2 C to 4.25 V and at 0.05 C until cut-off, and discharged at a constant current of 2.0 C to 2.5 V. Using the charging and discharging as one cycle, Two cycles were performed. Thereafter, the 2.0 C discharge capacity to the 0.2 C discharge capacity was measured for the battery, and is shown in Table 2 below. The ratio (%) of the 2.0 C discharge capacity to the 0.2 C discharge capacity is calculated as "2.0 C discharge capacity/0.2 C discharge capacity×100."

TABLE 2

| Positive Electrode Active Material of Lithium Secondary Battery | 2.0 C Discharge Capacity Ratio (%) |
|---|---|
| Example 1 | 94.8 |
| Comparative Example 1 | 89.6 |
| Comparative Example 2 | 91.5 |
| Comparative Example 3 | 78.4 |
| Comparative Example 4 | 74.9 |
| Comparative Example 5 | 75.3 |

According to Table 2 above, in the case of using crumpled graphene and plate-shaped graphene, it could be confirmed that when coated with a mechanofusion device, the discharge capacity was improved at a high C-rate of 2.0 C compared to when coated with a mechanical mixing device. In addition, in the case of using crumpled graphene, excellent discharge capacity was generally shown at a high C-rate of 2.0 C, and in particular, when coated with a mechanofusion device, the discharge capacity at a high C-rate of 2.0 C was hardly deteriorated even compared to that at a low C-rate of 0.2 C.

All of the simple modifications and variations of the present invention shall fall within the scope of the present invention, and the specific protection scope of the present invention will become apparent from the appended claims.

The invention claimed is:

1. A positive electrode active material for a lithium secondary battery comprising a lithium transition metal oxide on which a crumpled graphene-derived coating layer is formed, wherein crumpled graphene of the crumpled graphene-derived coating layer has a thickness of 0.1 to 10 nm, and wherein the crumpled graphene-derived coating layer has an Ip/IG value of 0.1 to 0.2.

2. The positive electrode active material for a lithium secondary battery according to claim 1, wherein the crumpled graphene has a BET specific surface area of more than 400 $m^2/g$.

3. The positive electrode active material for a lithium secondary battery according to claim 1, wherein the crumpled graphene contains 0.1 to 3% by weight of oxygen based on a total weight of the crumpled graphene.

4. The positive electrode active material for a lithium secondary battery according to claim 1, wherein the crumpled graphene has a size of 50 to 500 nm.

5. The positive electrode active material for a lithium secondary battery according to claim 1, wherein the lithium transition metal oxide is selected from the group consisting of $LiCoO_2$, $LiNiO_2$, $LiMnO_2$, $Li_2MnO_3$, $LiMn_2O_4$, $Li(Ni_aCO_bMn_c)O_2$ ($0<a<1$, $0<b<1$, $0<c<1$, $a+b+c=1$), $LiNi_{1-y}Co_yO_2$ ($O<y<1$), $LiCo_{1-y}Mn_yO_2$, $LiNi_{1-y}Mn_yO_2$ ($O<y<1$), $Li(Ni_aCo_bMn_c)$ $O_4$ ($0<a<2$, $0<b<2$, $0<c<2$, $a+b+c=2$), $LiMn_{2-z}Ni_zO_4$ ($0<z<2$), $LiMn_{2-z}Co_zO_4$ ($0<z<2$), and combinations thereof.

6. The positive electrode active material for a lithium secondary battery according to claim 1, wherein the crumpled graphene-derived coating layer has a thickness of 1 to 500 nm.

7. The positive electrode active material for a lithium secondary battery according to claim 1, wherein the lithium transition metal oxide on which the crumpled graphene-derived coating layer is formed has an electrical conductivity of $1.0\times10^{-2}$ to $1.0\times10$ S/cm.

8. The positive electrode active material for a lithium secondary battery according to claim 1, wherein the lithium transition metal oxide on which the crumpled graphene-derived coating layer is formed has a BET specific surface area of 2 to 10 $m^2/g$.

9. A method of preparing the positive electrode active material for a lithium secondary battery according to claim 1, comprising coating the crumpled graphene on the lithium transition metal oxide to form the crumpled graphene-derived coating layer on the lithium transition metal oxide, wherein the crumpled graphene has a thickness of 0.1 to 10 nm, and wherein the crumpled graphene-derived coating layer has an ID/IG value of 0.1 to 0.2.

10. The method of preparing the positive electrode active material for a lithium secondary battery according to claim 9, wherein the crumpled graphene has a BET specific surface area of more than 400 $m^2/g$.

11. The method of preparing the positive electrode active material for a lithium secondary battery according to claim 9, wherein the crumpled graphene contains 0.1 to 3% by weight of oxygen based on a total weight of the crumpled graphene.

12. The method of preparing the positive electrode active material for a lithium secondary battery according to claim 9, wherein the crumpled graphene has a size of 50 to 500 nm.

13. The method of preparing the positive electrode active material for a lithium secondary battery according to claim 9, wherein an $I_D/I_G$ value of the crumpled graphene-derived coating layer is 30 to 70% of an $I_D/I_G$ value of the crumpled graphene.

14. The method of preparing the positive electrode active material for a lithium secondary battery according to claim 9, wherein the crumpled graphene is coated on the lithium transition metal oxide by a mechanofusion method.

* * * * *